June 15, 1943.                J. O. WATSON                 2,322,076
                              STALK CUTTER
                         Filed April 30, 1941         3 Sheets-Sheet 1

Inventor
JAMES O. WATSON.
By  Clarence A. O'Brien
                                              Attorney June 15, 1943. J. O. WATSON 2,322,076
STALK CUTTER
Filed April 30, 1941 3 Sheets-Sheet 2
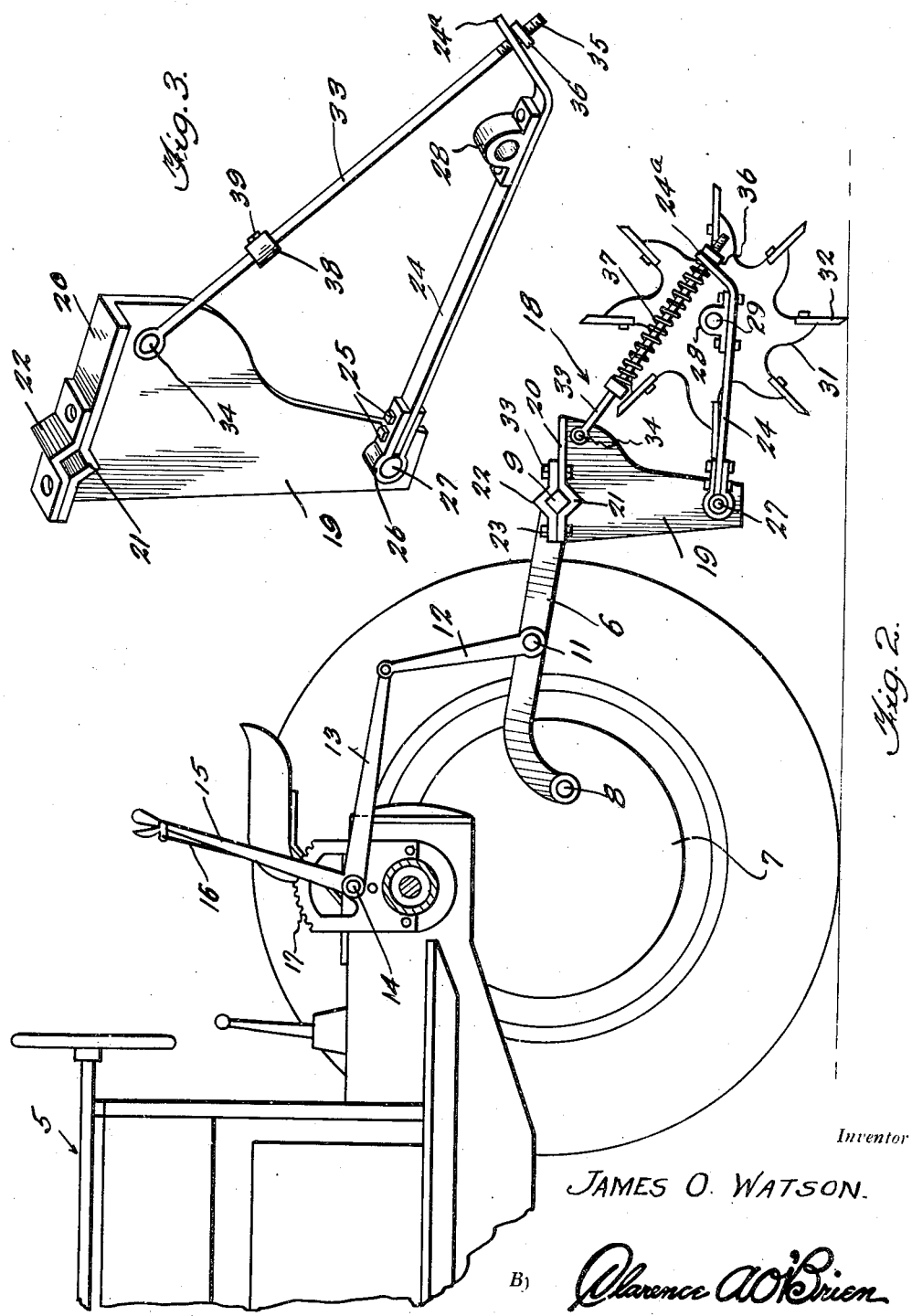
Inventor
JAMES O. WATSON.
By Clarence A. O'Brien
Attorney June 15, 1943.  J. O. WATSON  2,322,076
STALK CUTTER
Filed April 30, 1941  3 Sheets-Sheet 3

Inventor
JAMES O. WATSON

By *Clarence A. O'Brien*

Attorney

Patented June 15, 1943

2,322,076

UNITED STATES PATENT OFFICE 2,322,076

STALK CUTTER

James O. Watson, Cooper, Tex., assignor of one-fourth to C. C. Pickens, Cooper, Tex.

Application April 30, 1941, Serial No. 391,176

2 Claims. (Cl. 55—61)

This invention relates broadly to farming machines and more particularly to stalk cutters, and particularly to a stalk cutter which can be readily attached to a tractor.

More particularly it is an object of the present invention to provide a stalk cutter which may be readily attached to the tractor through the medium of the plow or bedder equipment with which farm tractors are usually equipped.

The invention together with its objects and advantages will be best understood from a study of the following description taken in connection with the accompanying drawings, wherein:

Figure 2 is a vertical sectional view taken substantially on the line 2—2 of Figure 1.

Figure 3 is a perspective view of a mounting bracket forming part of my invention.

Figure 1:
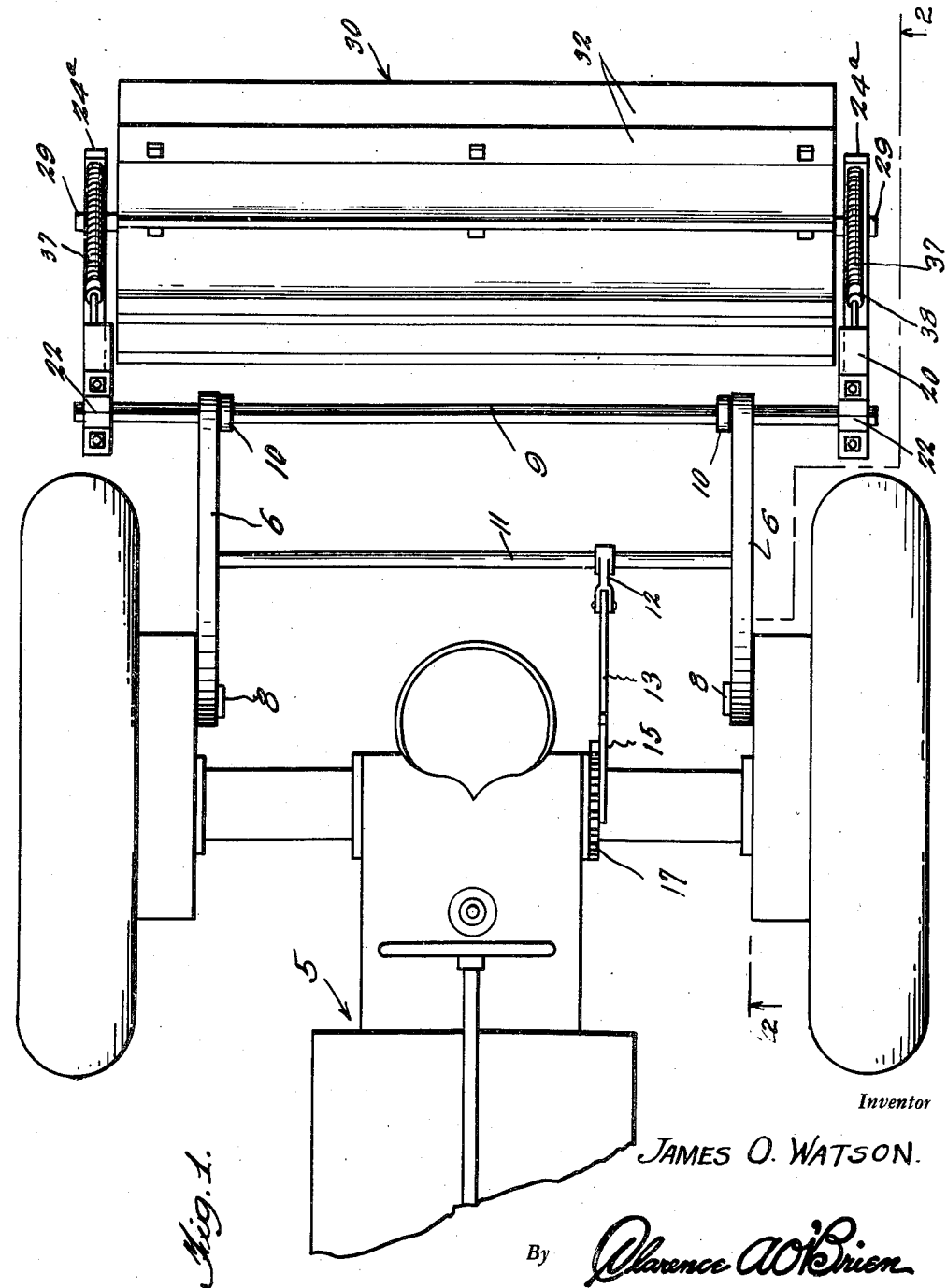
Figure 1 is a top plan view of the rear portion of a farm tractor having bedding equipment mounted thereon, and showing the application of my invention thereto.
Figure 4:
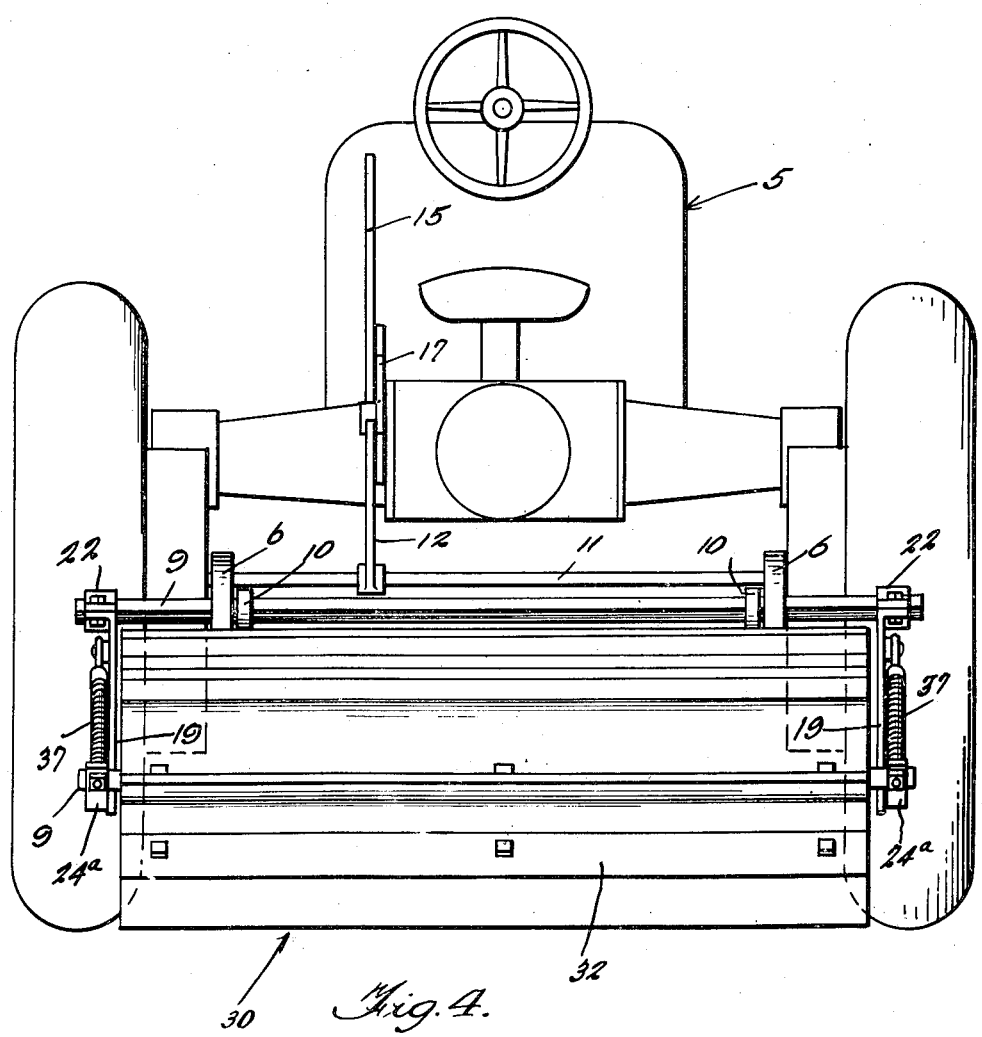
Figure 4 is a rear elevational view of a tractor with a stalk cutter embodying the features of the present invention mounted thereon.

Referring more in detail to the drawings, it will be seen that I have illustrated an ordinary farm tractor, 5, as equipped with a plow or bedding equipment, and of which equipment only such parts are shown and will be herein referred to as will be necessary for an understanding of this invention.

Among other parts the bedding equipment, in the present instance, is illustrated as embodying carrier arms 6 which at one end are pivoted to the brake drums 7 of the rear wheels of the tractor, as at 8; a cross bar 9 that is substantially square in cross section and extends through eyes provided therefor in the free ends of the carrier arms 6, being held against lateral displacement relative to the arms through the medium of abutment collars 10; and a cross bar 11 that extends between the arms 6 intermediate the ends of the arms and is pivotally connected through the medium of a link 12 with a crank arm 13 that is pivotally mounted at the rear of the tractor, as at 14; and the operating and control lever 15 with which the crank 13 is equipped, and by the operation of which the carrier arms 6 are simultaneously raised and lowered; the plows, not shown, usually mounted on the arms 6 being held in either raised or lowered position through the medium of the detent 16 with which the hand lever is equipped, and a rack segment 17 with which the detent 16 cooperates for securing the hand lever 15 at the desired position of adjustment.

My improved stalk cutter attachment is indicated generally by the reference numeral 18.

In the preferred embodiment thereof the stalk cutter attachment embodies a pair of bracket plates 19, and each of the plates 19 is provided at the upper edge thereof with a lateral flange 20 that is formed adjacent one end thereof, as at 21, to provide a clamping jaw cooperable with a removable clamping jaw 22 for positively securing the bracket plate 19 to an end of the cross bar 9 of the aforementioned bedder equipment.

Each jaw 22 is secured in cooperative position with respect to its complemental fixed jaw 21 through the medium of bolts or other fastening elements 23 as shown.

Also associated with each bracket plate 19 is a reel carrying arm 24 that has bolted to one end thereof, as at 25, a bearing sleeve 26 through the medium of which and a pivot pin 27 projecting laterally from the lower end of the bracket plate 19 the arm 24 is pivoted to its bracket plate 19.

Each of the arms 24 adjacent the free end thereof has riveted or otherwise secured thereto a bearing 28 for one end of the spindle 29 of a stalk cutting reel 30.

The stalk cutting reel 30 is of conventional structure embodying a plurality of spider members 31 mounted on the spindle 29 to rotate therewith, and radial cutting blades 32 which are suitably secured to the arms of the spider members as best shown in Figure 2.

The free ends of the reel carrying arms 24 are suspended from the bracket plates 19 through the medium of rods 33 that at one end are pivoted to the upper portions of the bracket plates 19, as at 34. At the free ends thereof the rods 33 have threaded sections 35 that extend through apertures provided in the upturned terminals 24a of the arms 24. Stop nuts 36 are threaded on the sections 35 of the rods 33 to retain the ends 24a of the arms 24 in engagement with the rods 33.

Also disposed about each rod 33 is a coil spring 37 that at one end impinges against the upturned end 24a of an arm 24 and at an opposite end impinges against a collar 38 sleeved on the rod 33 and secured thereon at the desired adjustment through the medium of a set screw or the like 39. It will thus be seen that by adjusting the collar 38 on the rod 33 the tension of the spring 37 may be regulated as desired.

It will also be appreciated that the springs 37 and rods 33 provide resilient supporting or suspension means for the free ends of the arms 24, and that the arms 24 are so suspended or supported from the bracket plates 19 as to permit sufficient free vertical movement of the arms 24 as the cutter passes over uneven surfaces, rocks, or other objects in the path thereof.

Thus provision is made for supporting the cutting reel 30 in a manner as to reduce the possibility of the reel becoming broken or in anywise damaged, to a minimum.

Also to facilitate the lubricating of the bearings 28, said bearings may be equipped with suitable connections (not shown) whereby the grease gun with which the tractor is usually equipped, may be used to advantage in maintaining the bearings 28 well lubricated thus enabling the operator to guard against undue wear.

It is thought that the manner of attaching the stalk cutter to the tractor, together with the many advantages of a stalk cutter embodying the features of the present invention will be clear and appreciated by those skilled in the art without further detailed description.

It is also to be understood that while I have herein illustrated and described the preferred embodiment of the invention, I do not wish to limit myself to the specific details, combination and arrangement of parts as herein illustrated and described, as I am fully aware that minor changes may be made therein by others working in the art to which this invention relates.

Having thus described the invention, what is claimed as new is:

1. A stalk cutter for attachment to a farm tractor having bedding equipment mounted thereon, said attachment embodying a pair of brackets of plate form disposed vertically and having a horizontal flange at their upper edges provided with clamps for positively securing the brackets to the cross bar of such bedding equipment, reel carrying arms pivoted at one end thereof to the lower portion of said brackets and projecting rearwardly from the brackets, suspension rods for said arms pivoted at one end to an upper portion of said brackets and having free ends loosely engaged with the free ends of said arms, a stalk cutting reel rotatably supported by and between said arms at an intermediate portion of the latter, and spring devices associated with said suspension rods and impinging against the free ends of said arms, yieldably urging the arms downwardly.

2. In combination with a tractor having bedding equipment embodying a pair of pivoted carrier arms, a cross bar carried by and extending between said arms, and raising and lowering mechanism connected with said carrier arms; a stalk cutter attachment embodying a plurality of brackets, each bracket consisting of a vertically disposed body plate formed at its upper edge with a horizontal flange having an integral clamping jaw, a removable clamping jaw complemental to said first-named clamping jaw and coacting therewith for securing a bracket to said cross bar, a reel carrying arm pivoted at one end thereof to the lower portion of the body plate of said bracket and projecting rearwardly from the bracket, a bearing mounted on said reel carrying arm forwardly of its rear end, a cutting reel having a spindle the ends of which are journaled in the bearings on said reel carrying arms, said arms being inclined upwardly at a point rearwardly of the bearings and resilient suspension means operatively connected with said brackets and the upwardly inclined free ends of said arms, said resilient suspension means for said arms embodying adjustable spring tension devices.

JAMES O. WATSON.